No. 787,223. PATENTED APR. 11, 1905.
O. SCHWADE.
VALVE GEAR FOR ENGINES.
APPLICATION FILED DEC. 12, 1904.

Witnesses:
James L. Norris, Jr.
C. A. Kesler

Inventor
Otto Schwade
By James L. Norris
Atty.

No. 787,223.

Patented April 11, 1905.

UNITED STATES PATENT OFFICE.

OTTO SCHWADE, OF ERFURT, GERMANY.

VALVE-GEAR FOR ENGINES.

SPECIFICATION forming part of Letters Patent No. 787,223, dated April 11, 1905.

Application filed December 12, 1904. Serial No. 236,571.

*To all whom it may concern:*

Be it known that I, OTTO SCHWADE, a subject of the King of Prussia, Emperor of Germany, residing at Erfurt, Germany, have invented certain new and useful Improvements in or Relating to Valve-Gear for Engines, of which the following is a specification.

The valve-gear according to this invention for double-cylinder steam-engines without a fly-wheel, with pistons guided so as to move in a straight line, comprises rotary bodies for the movement of the valves arranged in the valve-chest and completely debarred from longitudinal movement and operated by the valve-rods.

Figure 1:
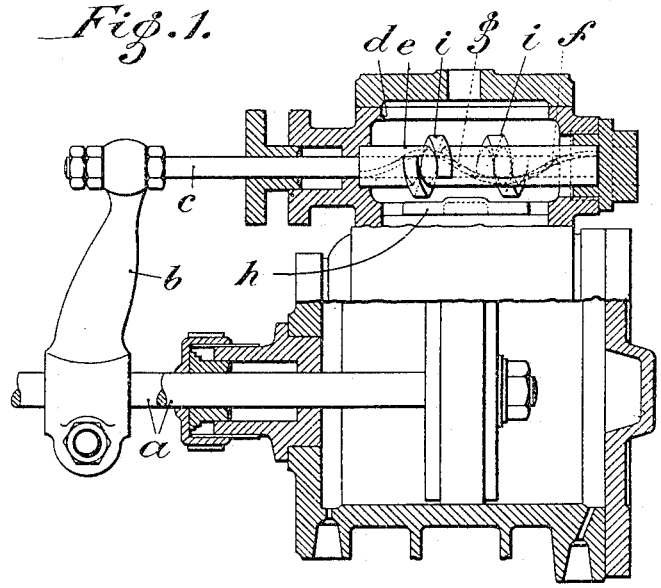
Figure 2:
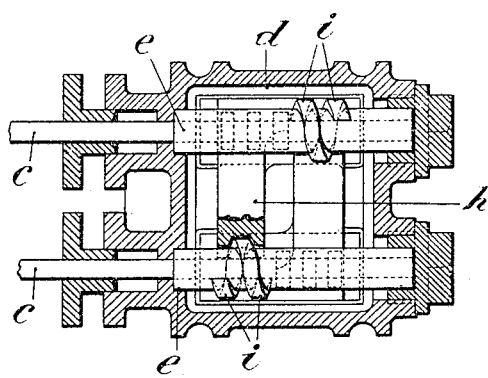
Figure 3:
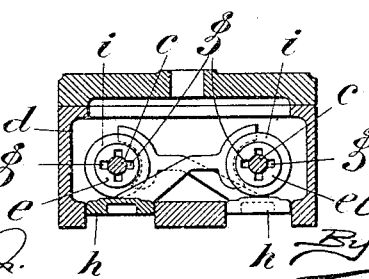

In the drawings, Figure 1 is a side elevation in longitudinal section. Fig. 2 is a sectional plan, and Fig. 3 is a transverse section looking to the rear.

In the construction illustrated by way of example in the accompanying drawings the piston-rods $a$ of a double-cylinder engine are connected by arms $b$ to valve-rods $c$, which therefore make the same stroke as the piston-rods. In the valve-chest $d$ rotary bodies $e$ are arranged in such manner that they are prevented from making longitudinal movement. Each of these rotary bodies $e$ is tubular and is rotated by its valve-rod $c$, owing to the latter being provided with an outside lug, worm-thread, or spiral rib $f$, with which a corresponding inner worm-thread or groove $g$ in the rotary body $e$ engages. The rotation of the body $e$ is transmitted to the valve $h$, which, for instance, may be a D or other valve. The rotary body of one cylinder operates the valve of the other cylinder. Where the valve-chests are parallel to the line of movement of the pistons, spiral ribs, such as $i$ or portions of such ribs on the rotary bodies, produce the movement of the valves $h$ when the rotary bodies $e$ are turned. If, however, the movement of the valves takes place at a right angle to the movement of the pistons, cams on the rotary bodies take the place of the outer spiral ribs.

This valve-gear has the advantage that all those parts which are usually arranged outside and are subject to wear are dispensed with, and consequently there is no longer any need to look after them or to lubricate them. The parts, which are all arranged in the interior of the valve-chest, are sufficiently lubricated by the oil-saturated steam, so that a saving in lubricating material is also effected. The valve-rods are accurately guided throughout the whole of their travel in the rotary bodies, and there are no bolts, screws, or nuts in the valve-chest liable to work loose.

The rotation of the rotary bodies according to this invention could also be effected by securing them to their valve-rods and preventing them in the manner described from longitudinal movement and turning both together by providing worm-grooves in the tubular ends of the arms $b$, with which engage corresponding ribs or threads on the valve-rods $c$. In this valve-gear also the number of loose parts is reduced to a minimum, as also is the weight of the moving parts of the valve-gear. All large sliding surfaces in the valve-chest are avoided, and in that way the dimensions of the valve-chest may be reduced to a minimum.

If desired, the rotary body can itself be formed as a piston-valve or connected to a piston-valve directly.

What I claim as my invention, and desire to secure by Letters Patent, is—

1. Valve-operating gear for two-cylinder steam-engines comprising a valve-chest, two rotary non-reciprocable valve-operating bodies in said valve-chest and spiral-screw means for rotating said bodies: substantially as set forth.

2. Valve-operating gear for two-cylinder steam-engines comprising a valve-chest, two rotary non-reciprocable valve-operating tubular bodies, valve-rods within said tubular bodies and spiral-screw connections between the valve-rods and their tubular bodies: substantially as set forth.

3. Valve-operating gear for two-cylinder steam-engines comprising a valve-chest, two rotary non-reciprocable valve-operating bodies in said chest, means for rotating said bodies, and projections on said bodies for operating the valve: substantially as set forth.

4. Valve-operating gear for two-cylinder steam-engines comprising a valve-chest, two rotary non-reciprocable valve-operating bodies in said chest, means for rotating said bodies, and spiral projections on said bodies for operating the valve: substantially as set forth.

5. Valve-operating gear for two-cylinder steam-engines comprising a valve-chest, two rotary non-reciprocable valve-operating tubular bodies, valve-rods within said tubular bodies, a spiral groove in each of said tubular bodies, and a corresponding spiral projection on each valve-rod: substantially as set forth.

6. Valve-operating gear for two-cylinder steam-engines comprising a valve-chest, two rotary non-reciprocable valve-operating tubular bodies, valve-rods within said tubular bodies, a spiral groove in each of said tubular bodies, a corresponding spiral projection on each valve-rod and a valve-operating projection on the exterior of the rotary tubular body: substantially as set forth.

7. Valve-operating gear for two-cylinder steam-engines comprising a valve-chest, two rotary non-reciprocable valve-operating tubular bodies, valve-rods within said tubular bodies, a spiral groove in each of said tubular bodies, a corresponding spiral projection on each valve-rod and a spiral valve-operating projection on the exterior of the rotary tubular body: substantially as set forth.

In testimony whereof I have signed my name to this specification in the presence of two subscribing witnesses.

OTTO SCHWADE.

Witnesses:
PAUL TEICHMANN,
J. Y. PARTELLO.